June 24, 1930. N. T. PINDAR 1,767,941
SHARPENING DEVICE FOR CURVED EDGED TOOLS
Filed Feb. 14, 1928
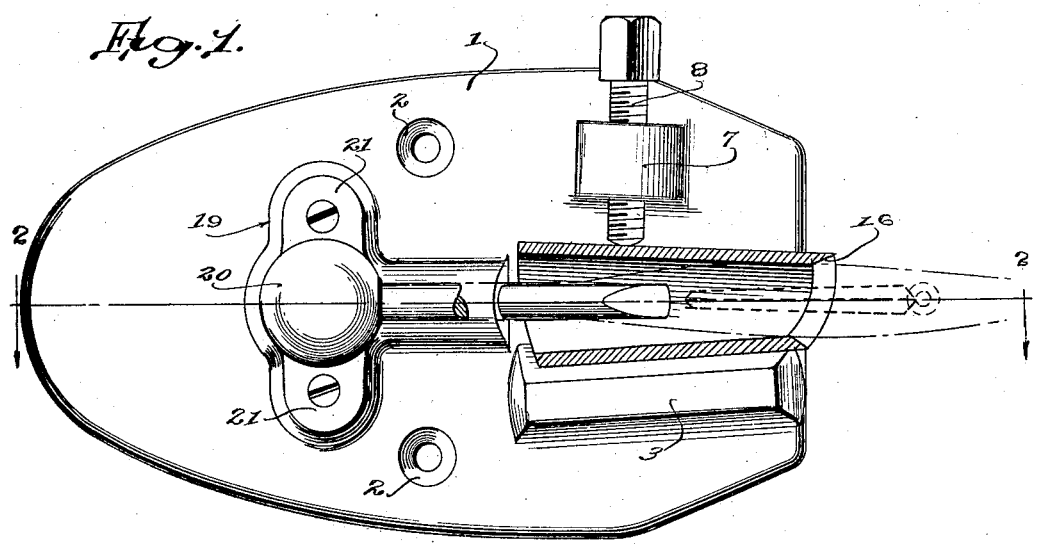
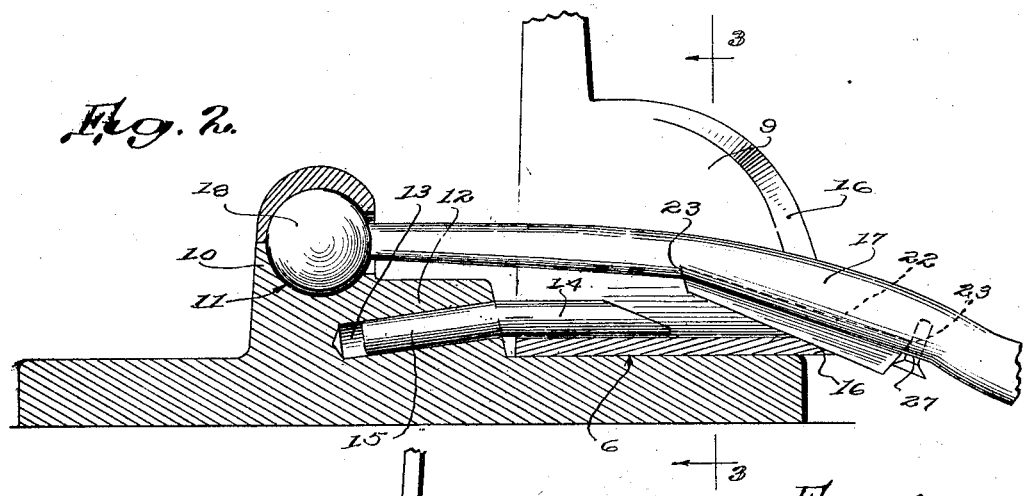
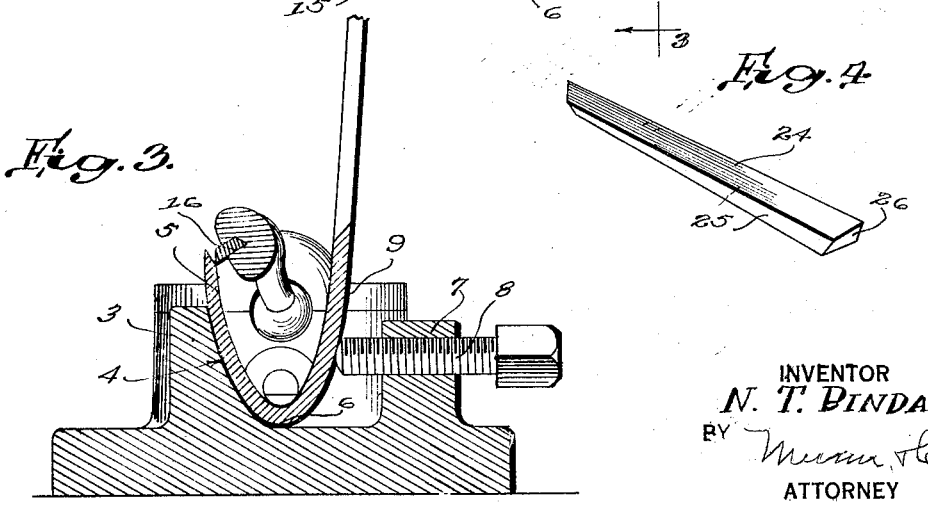
INVENTOR
N. T. PINDAR
BY
ATTORNEY Patented June 24, 1930

1,767,941

UNITED STATES PATENT OFFICE

NORRIS T. PINDAR, OF VALDOSTA, GEORGIA

SHARPENING DEVICE FOR CURVED-EDGED TOOLS

Application filed February 14, 1928. Serial No. 254,289.

This invention relates to tool sharpening devices, and is more particularly concerned with a sharpening device for curved edge tools such as the turpentine hack which presents a curved cutting edge substantially semi-elliptical in shape.

Curved edges of this type are difficult to cut and sharpen and when, as is largely practised, this operation is performed by hand filing and cutting, both skill and time are required in a substantial degree.

It is the object of my invention to provide a manually operable sharpening tool for traversing and conforming to the swing of the curved cutting edge making it possible to sweep the fluid curved cutting edge at one stroke and at the proper angle.

Accordingly, a feature of the invention consists in combination with a tool seat and clamp of a cutter or sharpener-carrying arm mounted for universal swinging movement, including axial turning movement, continuously to contact the cutter or sharpener with the curved edge of the work.

These and other features of the invention including certain novel construction, arrangements and combinations of parts, will be more clearly apparent from the following detailed specification when read in conjunction with the accompanying drawings forming part thereof and in which:—

Figure 1 is a top plan view of the sharpening device with the operating arm and upper portion of the hack tool broken away to show the tool seating and clamping devices.

Figure 2 is a longitudinal vertical section through the device on the line 2—2 of Figure 1, the sharpening arm and hold-down pin being left in elevation.

Figure 3 is a transverse vertical section on line 3—3 of Figure 2.

Figure 4 is a detail of the tool sharpening cutter blade.

The tool of the present invention is a portable one, and comprises a flat base plate 1 having appropriately located counter-sunk openings 2 by means of which it may be screwed to a suitable base. At its front edge which is preferably straight, a tool seat and clamp is located. This seat is provided by an upstanding wall 3 extending rearwardly from the front edge of the plate and having its inner face 4 curved in conformity with the curvature of the outer face of one side of the curved blade 5 of a turpentine hack, the base 6 of this blade resting upon the base plate 1 at the base of the curved wall 4. Spaced from the wall 5 transversely of the base plate is a lug 7 having a threaded bore therethrough, through which the shank of a clamp screw 8 extends to engage the opposite face 9 of the curved blade of the cutting tool at a point intermediate the upper and lower ends of the curved blade engaging face 4 of the wall 3.

Inwardly of and alined with the blade seat, the base plate 1 is formed with a T shaped upward extension providing a supporting post 10 having a semi-cylindrical socket 11 formed in its upper face and a lower foot portion 12 having an upwardly inclined socket 13 formed therein. The base 6 of the cutting blade of the curved edge tool is held down upon its seat on the base plates 1 while it is clamped by the screw 8 against the face 4 of its wall seat by means of a pin 14 having a bent rear portion 15 inclined relatively to the forward portion of the pin at an angle corresponding to the angle of inclination of the socket 12. By inserting the bent rear end 15 of the pin 14 in the socket 13 up to the line of bend with the forward portion of the pin engaging and overlying the inside face of the base 6 of the cutting blade the latter will be held down in its seat against upward movement therefrom by reason of the seating of the bent rear end of the pin and the socket 13, the pin and socket being of corresponding diameters to provide a firm seat for the pin therein.

From the foregoing it will be seen that the curved blade of the cutting tool is seated upon the base with its curved cutting edge 16 forming a substantially semi-elliptical path approximately at right angles to the plane of the base plate 1. In order to provide for movement of a cutting tool traversing the curved cutting edge of the blade with the cutter thereof inclined to the angle of the cutting edge 16 of the tool, a cutter-carrying arm 17 is provided having its rear end formed as a ball 18 which seats in the semi-cylindrical socket 11 of the post 10 and is held therein by a cap plate 19 having a central substantially semi-cylindrical bearing portion 20 engaging the upper face of the ball 18. The cap 19 is provided with lugs 21 laterally offset from the central bearing portion 20 and overlying and screwed to the upper face of the post 10 at opposite sides of its socket 11. The arm 17 is thus provided with a ball joint at its rear end by means of which it has universal movement transversely of the base plate 1 and about its longitudinal axis, so that it may traverse the curved cutting edge of the tool whose edge is to be sharpened and may be, at the same time, axially turned to present the edge of its cutter at the proper angle to the curved cutting edge 16 of the tool. Provision is made in the handle for seating an edged cutter of sufficient length to, at all times, contact with the cutting edge 16 during the swing of the tool thereover. The under face of the arm 17 is provided with a narrow elongated recess 22 therein having its ends 23 oppositely angled to receive and seat the reversely angled ends of a cutter 24 having its sides formed on different angles to provide cutting edges 25 and 26 of different angularities. The cutter 24 is retained in its seat in the arm 17 by the head of a screw 27 inserted in a threaded bore formed in the under side of the handle 17 adjacent to an at the outer angled edge 23 of its cutter seat.

It will be obvious that the arm 17, which is provided with a suitable operating handle at its outer end (not shown), in sharpening the cutting edge 16 of the turpentine hack shown as seated upon the base plate 1, is swung transversely of the cutting edge by the operator with the latter bearing down upon the arm to engage the cutting edge 25—26 of the cutter with the edge 16 of the tool, the arm 17 being turned by its longitudinal axis as it traverses the curved cutting edge 16 to conform the cutting edge 25—26 to the changing angle of the edge 16 due to its curvature and semi-elliptical path. By providing a cutter-carried arm 17 having a universal movement such as described, therefore, the curved edge 16 of the tool may be completely traversed by the swinging of the arm and with the operator exerting adequate axial turning pressure on the arm, the edge of the cutter 24 will at all times during its traverse, engage and cut the edge 16 at the desired angle or bevel and in a uniform manner. By reason of the continuous traversing cutting action and the ability of the operator to turn the arm by its longitudinal axis to continuously engage the edge of the cutter with the curving edge 16 of the blade to be sharpened, the operation of sharpening the edge 16 through the traversing movement of the cutter requires relatively little time and substantially less skill than has been heretofore required by the laborious process of hand filing and produces better results by reason of the uniform and continuous sweep or traverse of the cutting tool.

The described sharpening device with its tool clamping means while adapted particularly to tools of the type of turpentine hacks and pullers is of use generally in connection with curved cutting blades and is susceptible of modifications and adaptations thereto within the spirit of the invention and the scope of the appended claims.

What I claim therefore, and desire to secure by Letters Patent is:

1. A device of the character described comprising a base having an abutment thereon conforming to and seating one side of the curved cutting blade of a curved edge tool, means on said base for clamping said blade against said abutment seat, means for holding said blade down on said base, a support uprising from said base, a blade sharpening arm having its inner end mounted on said support for universal movement and extending transversely of the cutting edge of a clamped cutting blade, and an elongated cutter seated on said arm to traverse said blade edge.

2. A device of the character described comprising a base plate having an upstanding wall adjacent one edge provided with a curved inner face conforming to and seating the curved face of one side of a curved blade edge tool, clamping means on said base to engage and clamp said blade against said wall seat, means engaging and anchoring the base of said blade upon said base plate, a support rearwardly of said blade seat upstanding from said base plate, an arm extending transversely of the cutting edge of a clamped blade and having its inner end formed as a ball, a bearing for said ball on said elevated support permitting universal movement of said arm, and an elongated edge-sharpening tool mounted on said arm to overlie and traverse the cutting edge of a clamped blade.

3. A device of the character described comprising a base plate having an upstanding wall adjacent one edge provided with a curved inner face conforming to and seating the curved face of one side of a curved blade edge tool, clamping means on said base to engage and clamp said blade against said wall seat, a pin detachably anchoring to said base plate and overlying and holding down thereon the base of said blade, a post upstanding from the base plate rearwardly of the blade seat and having a ball socket thereon, an arm having its inner end formed as a ball seating and journaling in said socket for universal movement, said arm extending outwardly transversely over the cutting edge of the clamped blade to be sharpened and having a longitudinal cutter receiving slot therein, and an elongated cutter seated in said slot and positioned to traverse the edge of a clamped blade.

4. A device of the character described comprising a flat surfaced base plate provided adjacent to its front edge with an upstanding abutment wall having a concaved abutment face, for one side of a curved blade edge tool to be sharpened, means spaced from said wall and upstanding from said base to engage the opposite side of the blade to clamp its opposite side against said concaved face, a support upstanding from said base plate rearwardly of said wall, an arm having its inner end mounted on said support for transverse swinging movement and for axial turning movement, said arm extending outwardly from the outer edge of said base plate and having an elongated cutter seat formed therein, and an elongated cutter bar mounted in said seat with its cutting edge extending transversely of the cutting edge of a blade held between said concaved abutment face and said upstanding spaced cooperating clamping means.

Signed at Valdosta, in the county of Lowndes and State of Georgia, this 6th day of Feby., A. D. 1928.

NORRIS T. PINDAR.